United States Patent
Ravimohan et al.

(10) Patent No.: US 9,715,445 B2
(45) Date of Patent: Jul. 25, 2017

(54) FILE DIFFERENTIATION BASED ON DATA BLOCK IDENTIFICATION

(71) Applicants: Narendhiran Chinnaanangur Ravimohan, Bangalore (IN); Vithya Kannappan, Bangalore (IN); Saranya Nedunchezhiyan, Bangalore (IN); Sivaraj Velusamy, Bangalore (IN)

(72) Inventors: Narendhiran Chinnaanangur Ravimohan, Bangalore (IN); Vithya Kannappan, Bangalore (IN); Saranya Nedunchezhiyan, Bangalore (IN); Sivaraj Velusamy, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 294 days.

(21) Appl. No.: 13/947,850

(22) Filed: Jul. 22, 2013

(65) Prior Publication Data
US 2014/0281158 A1 Sep. 18, 2014

(30) Foreign Application Priority Data
Mar. 14, 2013 (IN) .......................... 1108/CHE/2013

(51) Int. Cl.
*G06F 12/02* (2006.01)
(52) U.S. Cl.
CPC .. *G06F 12/0246* (2013.01); *G06F 2212/7202* (2013.01)

(58) Field of Classification Search
CPC ......... G06F 12/0246; G06F 2212/1036; G06F 2212/7202
USPC ........................................... 711/103
See application file for complete search history.

(56) References Cited

U.S. PATENT DOCUMENTS

| | | | |
|---|---|---|---|
| 2007/0101095 A1 | 5/2007 | Gorobets | |
| 2008/0104309 A1 | 5/2008 | Cheon et al. | |
| 2008/0126680 A1* | 5/2008 | Lee et al. | 711/103 |
| 2009/0043831 A1 | 2/2009 | Antonopoulos et al. | |
| 2009/0049234 A1 | 2/2009 | Oh et al. | |
| 2010/0050053 A1* | 2/2010 | Wilson et al. | 714/773 |
| 2010/0153631 A1 | 6/2010 | Moon et al. | |
| 2010/0241789 A1 | 9/2010 | Chu et al. | |
| 2011/0010489 A1 | 1/2011 | Yeh | |
| 2012/0278532 A1* | 11/2012 | Bolanowski | 711/103 |
| 2012/0317337 A1* | 12/2012 | Johar et al. | 711/103 |

* cited by examiner

*Primary Examiner* — Gary Portka
(74) *Attorney, Agent, or Firm* — Brinks Gilson & Lione (57) ABSTRACT

A memory system or flash card may include an algorithm for identifying and accounting for the rewrite frequency of data to be written to the card. The file system partition or file type of data may be used for monitoring rewrite frequency and predicting future rewrites. A learning algorithm that monitors rewrites may be implemented in firmware for accurate and dynamic identification of file types/partitions with the most likely rewrites. The identification of rewrites may be used to sort the data into groups (e.g. hot data=likely rewritten, and cold data=not likely to be rewritten). The hot data may stay in single level cell (SLC) update blocks longer, while the cold data can be moved to MLC blocks sooner.

9 Claims, 7 Drawing Sheets

FILE DIFFERENTIATION BASED ON DATA BLOCK IDENTIFICATION

PRIORITY

This application claims priority to India Patent Application No. 1108/CHE/2013, filed on Mar. 14, 2013, entitled "FILE DIFFERENTIATION BASED ON DATA BLOCK IDENTIFICATION," the entire disclosure of which is hereby incorporated by reference.

TECHNICAL FIELD

This application relates generally to memory devices. More specifically, this application relates to identifying and handling data with frequent rewrites in non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Multi-level cell (MLC) memory may be subject to endurance or performance problems as a result of data groups that are frequently rewritten. The memory device firmware may handle memory in logical groups and the logical to physical address table may have one entry for each logical group, so the data belonging to one logical group will exist in consecutive physical addresses. In particular, MLC logical group invalidation and as a result at a later point of time erase operation, may occur more frequently in the case of logical groups that are rewritten more frequently. Flash memory may be written in pages and erased in blocks, so once a page is written, a rewrite may require the whole block to be erased. In firmware, once data is rewritten, the old data may be marked as invalid so that it can be erased during garbage collection and may write the new data in another already erased block. Frequent erase operations may decrease endurance of the MLC block. A prediction of which addresses will be frequently rewritten can be used to retain the predicted addresses for a longer time in single level cell (SLC) blocks. The reason data blocks that are predicted to be frequently rewritten are retained in the SLC block may be that the endurance of SLC blocks is greater than MLC blocks and when more erases are required on a particular data block it may be preferable that it is in an SLC block.

SUMMARY

It may be desirable to identify partitions or file types that are subject to frequent rewrites. A learning algorithm that monitors rewrites may be implemented in memory card controller firmware for accurate and dynamic identification of file types/systems with the most likely rewrites. The identification of rewrites may be used to sort the data into groups (e.g. hot data=likely rewritten file types/partition, and cold data=not likely to be rewritten file types/partition). The hot data may stay in single level cell (SLC) update blocks longer, while the cold data can be moved to MLC blocks sooner.

BRIEF DESCRIPTION OF THE PRESENTLY PREFERRED EMBODIMENTS

Figure 1:
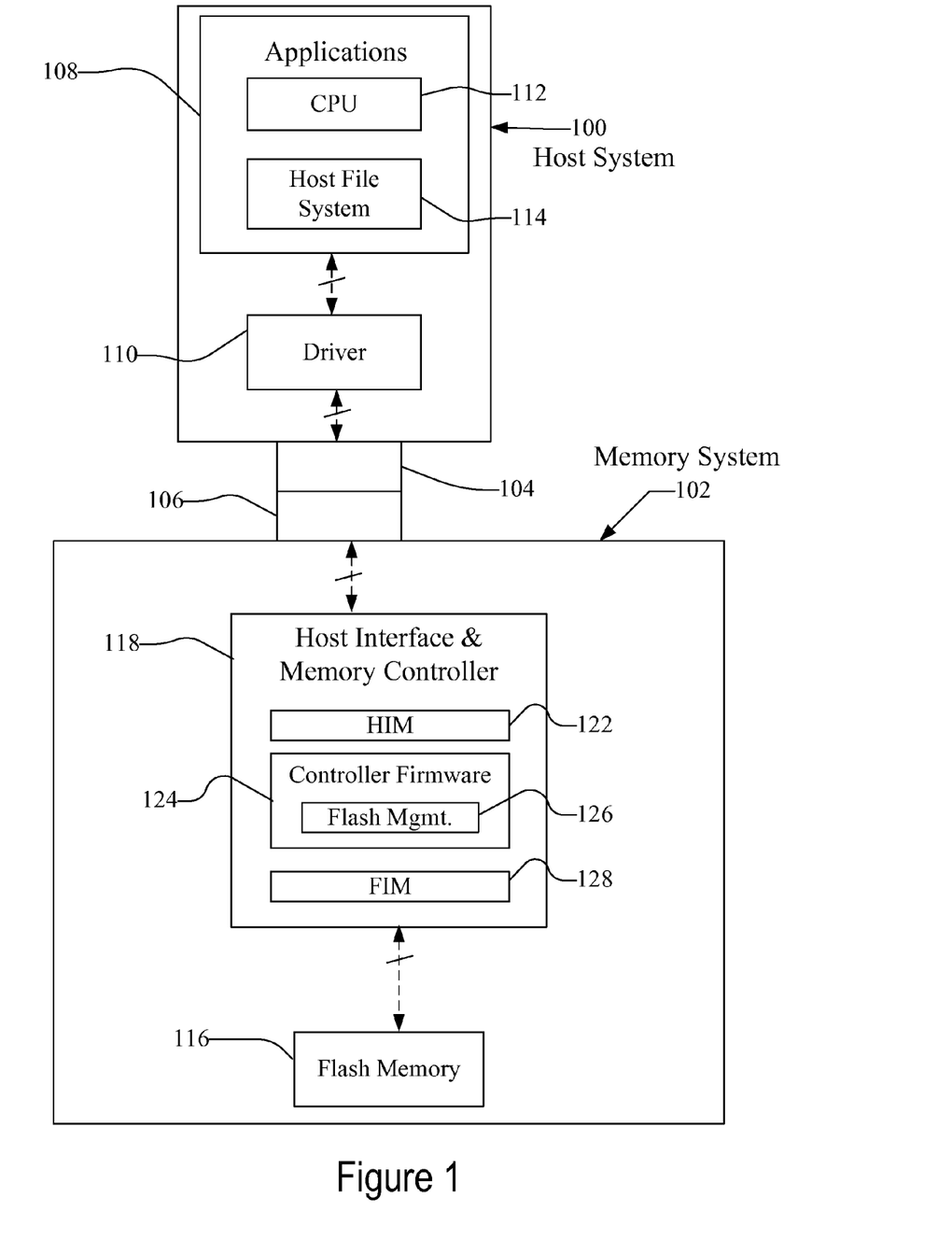
FIG. 1 is a block diagram of a host connected with a memory system having non-volatile memory.

A flash memory system suitable for use in implementing aspects of the invention is shown in FIGS. 1-6. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives. As described, flash memory may refer to the use of a negated AND (NAND) cell that stores an electronic charge.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory device 102 is concerned, made up of a combination of circuitry and software. An applications portion 108 may interface with the memory device 102 through a file system module 114 and driver 110. In a PC, for example, the applications portion 108 may include a processor 112 for running word processing, graphics, control or other popular application software. In a camera, cellular telephone that is primarily dedicated to performing a single set of functions, the applications portion 108 may be implemented in hardware for running the software that operates the camera to take and store pictures, the cellular telephone to make and receive calls, and the like.

The memory system 102 of FIG. 1 may include non-volatile memory, such as flash memory 116, and a device controller 118 that both interfaces with the host 100 to which the memory system 102 is connected for passing data back and forth and controls the memory 116. The device controller 118 may convert between logical addresses of data used by the host 100 and physical addresses of the flash memory 116 during data programming and reading. Functionally, the device controller 118 may include a Host interface module (HIM)122 that interfaces with the host system controller logic 110, and controller firmware module 124 for coordinating with the host interface module 122, and flash interface module 128. Flash management logic 126 may be part of the controller firmware 214 for internal memory management operations such as garbage collection. One or more flash interface modules (FIMs) 128 may provide a communication interface between the controller with the flash memory 116.

A flash transformation layer ("FTL") or media management layer ("MML") may be integrated in the flash management 126 and may handle flash errors and interfacing with the host. In particular, flash management 126 is part of controller firmware 124 and FTL may be a module in flash management. The FTL may be responsible for the internals of NAND management. In particular, the FTL may be an algorithm in the memory device firmware which translates writes from the host 100 into writes to the flash memory 116. The FTL may be needed because: 1) the flash memory may have limited endurance; 2) the flash memory 116 may only be written in multiples of pages; and/or 3) the flash memory 116 may not be written unless it is erased as a block. The FTL understands these potential limitations of the flash memory 116 which may not be visible to the host 100. Accordingly, the FTL attempts to translate the writes from host 100 into writes into the flash memory 116.

In one embodiment, the flash memory 116 may be considered to include three types of memory. The three types of flash memory may include binary cache, update blocks, and multi-level cell (MLC) memory. As described certain of these types of memory may be included as part of the device controller 118 rather than as part of the flash memory 116. The binary cache and the update blocks may be a small part of the flash memory 116, while the MLC may occupy most of the flash memory 116. Both binary cache and update blocks may be SLC memory. For binary cache, partial page writes may be possible and writes shorter than a page may be put into the binary cache. Update blocks may be SLC memory with page based addressing or page based Logical Group (LG) organization. Writes that are either non-sequential or non-aligned with the page boundary and equal to or more than a page size may go into the update blocks. The data in the update blocks may be consolidated further once intact logical groups of the size of the MLC memory logical group are formed. In addition, consolidation may occur once the update blocks do not have enough space for the incoming data. At that point, the data in the update blocks may be moved into the MLC memory. Likewise, the data in the binary cache may also be consolidated after a certain time period and may be placed in the update block. The MLC memory blocks may hold the majority of the data. Writes which are predicted to be definitely sequential and aligned with the physical page boundary may be written into the MLC memory. Also, data consolidated inside the update blocks and data from the binary cache which was consolidated inside the update blocks is moved into the MLC memory blocks. The MLC memory blocks may have a logical group size greater than or equal to a page and less than or equal to a block.

As described below, the identification of hot and cold data identification may be used in determining which memory type data should be stored in. In particular, the implementation phase of FIGS. 8 and 10 may include writing or maintaining hot data (frequently rewritten) in binary cache or update blocks, while cold data (not frequently rewritten) to MLC memory. In particular, data more likely to be rewritten is retained in the page based update blocks for a longer time than other data which is copied to the MLC to allow for space for hotter (frequently rewritten) writes. The algorithm described below detects recent writes and through a learning algorithm (e.g. FIGS. 7 and 9) categorizes the writes based on rewriting frequency (e.g. hot or cold).

Figure 2:
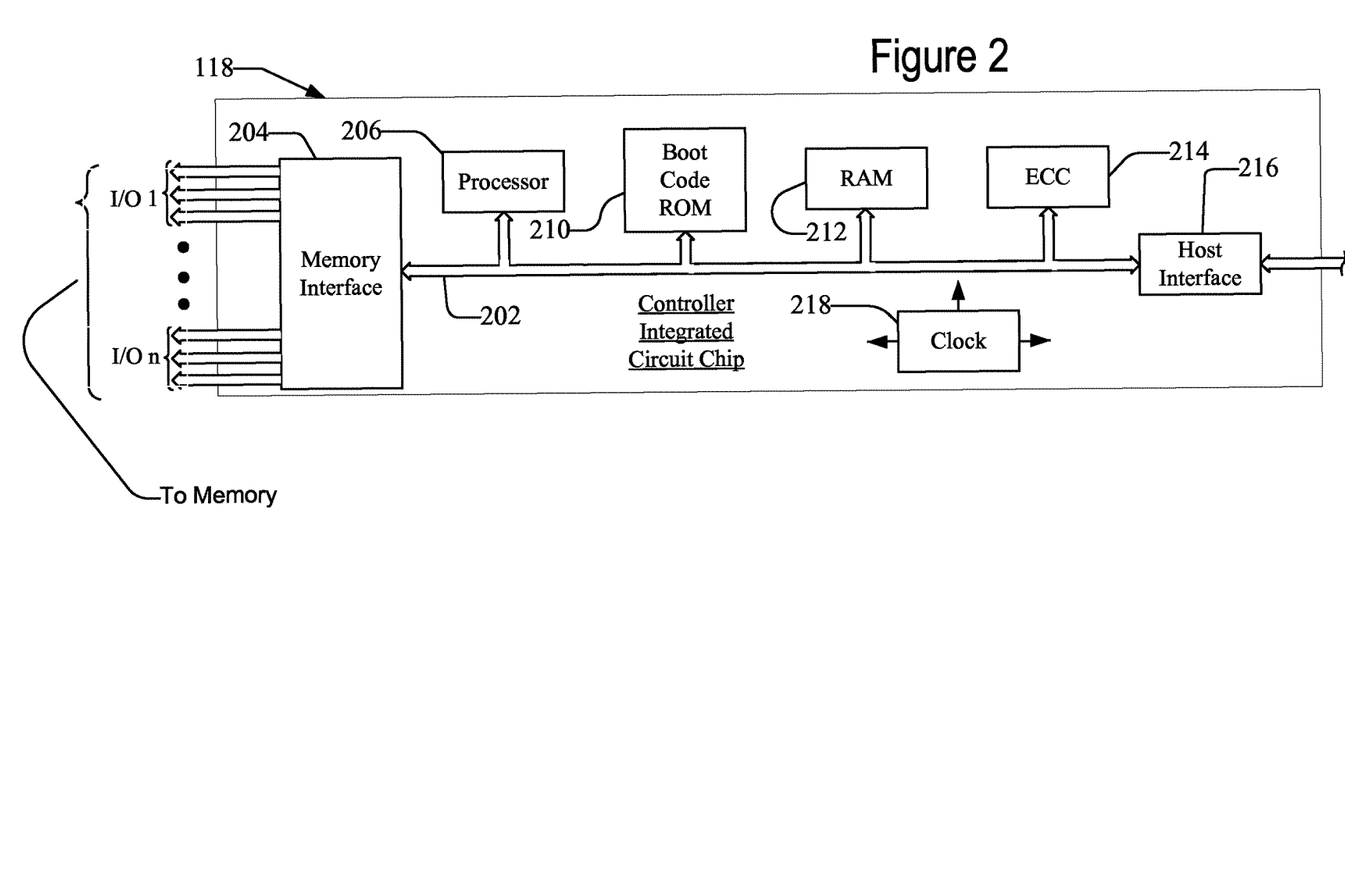
FIG. 2 is a block diagram of an exemplary flash memory device controller for use in the system of FIG. 1.

The device controller 118 may be implemented on a single integrated circuit chip, such as an application specific integrated circuit (ASIC) such as shown in FIG. 2. The processor 206 of the device controller 118 may be configured as a multi-thread processor capable of communicating via a memory interface 204 having I/O ports for each memory bank in the flash memory 116. The device controller 118 may include an internal clock 218. The processor 206 communicates with an error correction code (ECC) module 214, a RAM buffer 212, a host interface 216, and boot code ROM 210 via an internal data bus 202.

The host interface 216 may provide the data connection with the host. The memory interface 204 may be one or more FIMs 128 from FIG. 1. The memory interface 204 allows the device controller 118 to communicate with the flash memory 116. The RAM 212 may be a static random-access memory ("SRAM"). The ROM 210 may be used to initialize a memory system 102, such as a flash memory device. The memory system 102 that is initialized may be referred to as a card. The ROM 210 in FIG. 2 may be a region of read only memory whose purpose is to provide boot code to the RAM for processing a program, such as the initialization and booting of the memory system 102. The ROM may be present in the ASIC rather than the flash memory chip.

Figure 3:
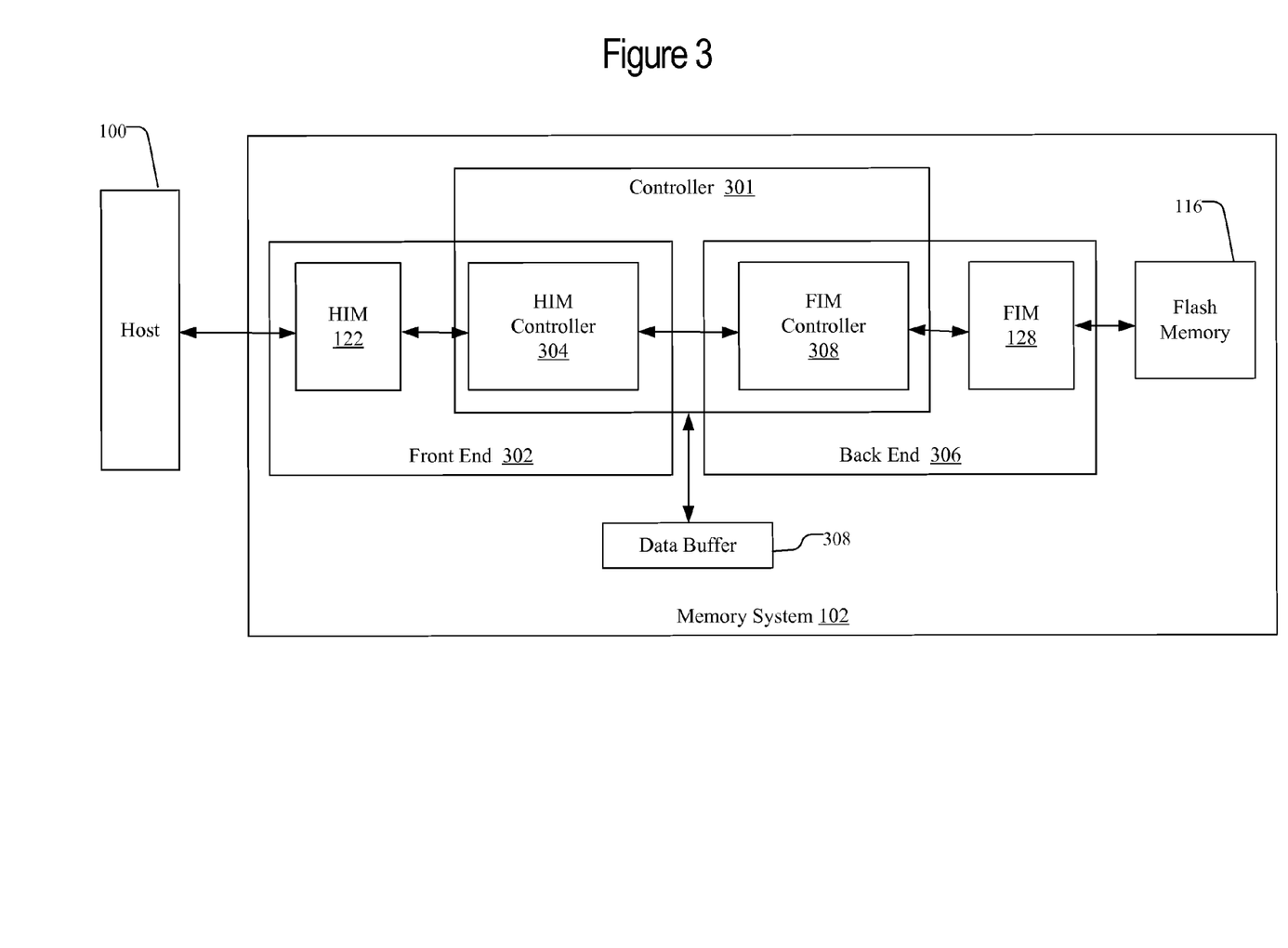
FIG. 3 is a block diagram of an alternative memory communication system.

FIG. 3 is a block diagram of an alternative memory communication system. The host system 100 is in communication with the memory system 102 as discussed with respect to FIG. 1. The memory system 102 includes a front end 302 and a back end 306 coupled with the flash memory 116. In one embodiment, the front end 302 and the back end 306 may be referred to as the memory controller and may be part of the device controller 118. The front end 302 may logically include a Host Interface Module (HIM) 122 and a HIM controller 304. The back end 306 may logically include a Flash Interface Module (FIM) 128 and a FIM controller 308. Accordingly, the controller 301 may be logically portioned into two modules, the HIM controller 304 and the FIM controller 308. The HIM 122 provides interface functionality for the host device 100, and the FIM 128 provides interface functionality for the flash memory 116. The controller 301 may be coupled with a data buffer 308. The FIM controller 308 may include the algorithms implementing the learning phase and implementation phase as described below with respect to FIGS. 7-10.

In operation, data is received from the HIM 122 by the HIM controller 304 during a write operation of host device 100 on the memory system 102. The HIM controller 304 may pass control of data received to the FIM controller 308, which may include the FTL discussed above. The FIM controller 308 may determine how the received data is to be written onto the flash memory 116 optimally. The received data may be provided to the FIM 128 by the FIM controller 308 for writing data onto the flash memory 116 based on the determination made by the FIM controller 308. In particular, depending on the categorization of the data it may be written differently (e.g. to MLC or retained in an update block).

Figure 4:
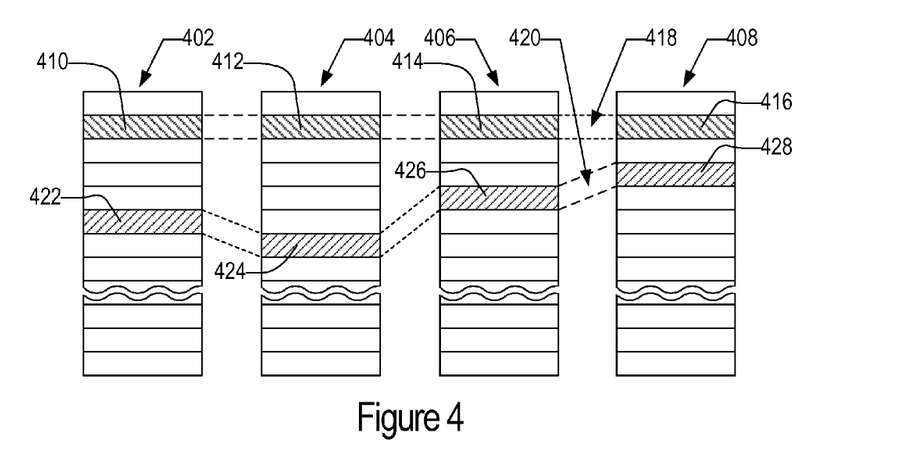
FIG. 4 is an example physical memory organization of the system of FIG. 1.

FIG. 4 conceptually illustrates an organization of the flash memory 116 (FIG. 1) as a cell array. The flash memory 116 may include multiple memory cell arrays which are each separately controlled by a single or multiple memory controllers 118. Four planes or sub-arrays 402, 404, 406, and 408 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 4 by rectangles, such as blocks 410, 412, 414, and 416, located in respective planes 402, 404, 406, and 408. There can be any number of blocks in each plane.

The block of memory cells is the unit of erase, and the smallest number of memory cells that are physically erasable together. For increased parallelism, however, the blocks may be operated in larger metablock units. One block from each plane is logically linked together to form a metablock. The four blocks 410, 412, 414, and 416 are shown to form one metablock 418. All of the cells within a metablock are typically erased together. The blocks used to form a metablock need not be restricted to the same relative locations within their respective planes, as is shown in a second metablock 420 made up of blocks 422, 424, 426, and 428. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
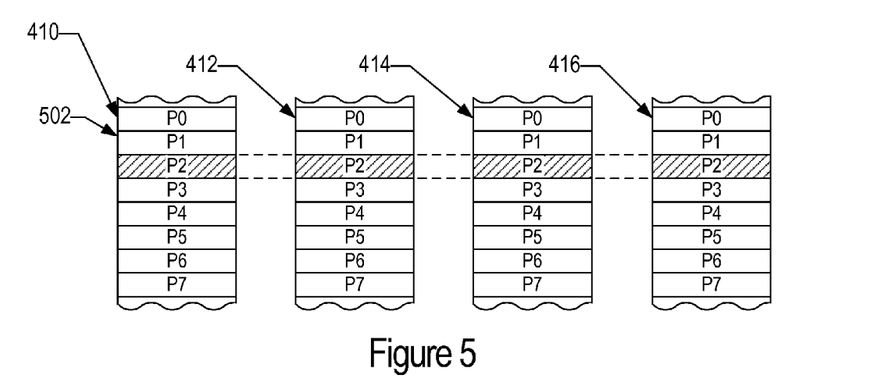
FIG. 5 is an expanded view of a portion of the physical memory of FIG. 4.

The individual blocks are in turn divided for operational purposes into pages of memory cells, as illustrated in FIG. 5. The memory cells of each of the blocks 410, 412, 414, and 416, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 502 is illustrated in FIG. 4, being formed of one physical page from each of the four blocks 410, 412, 414, and 416. The metapage 502, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material.

In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Figure 6:
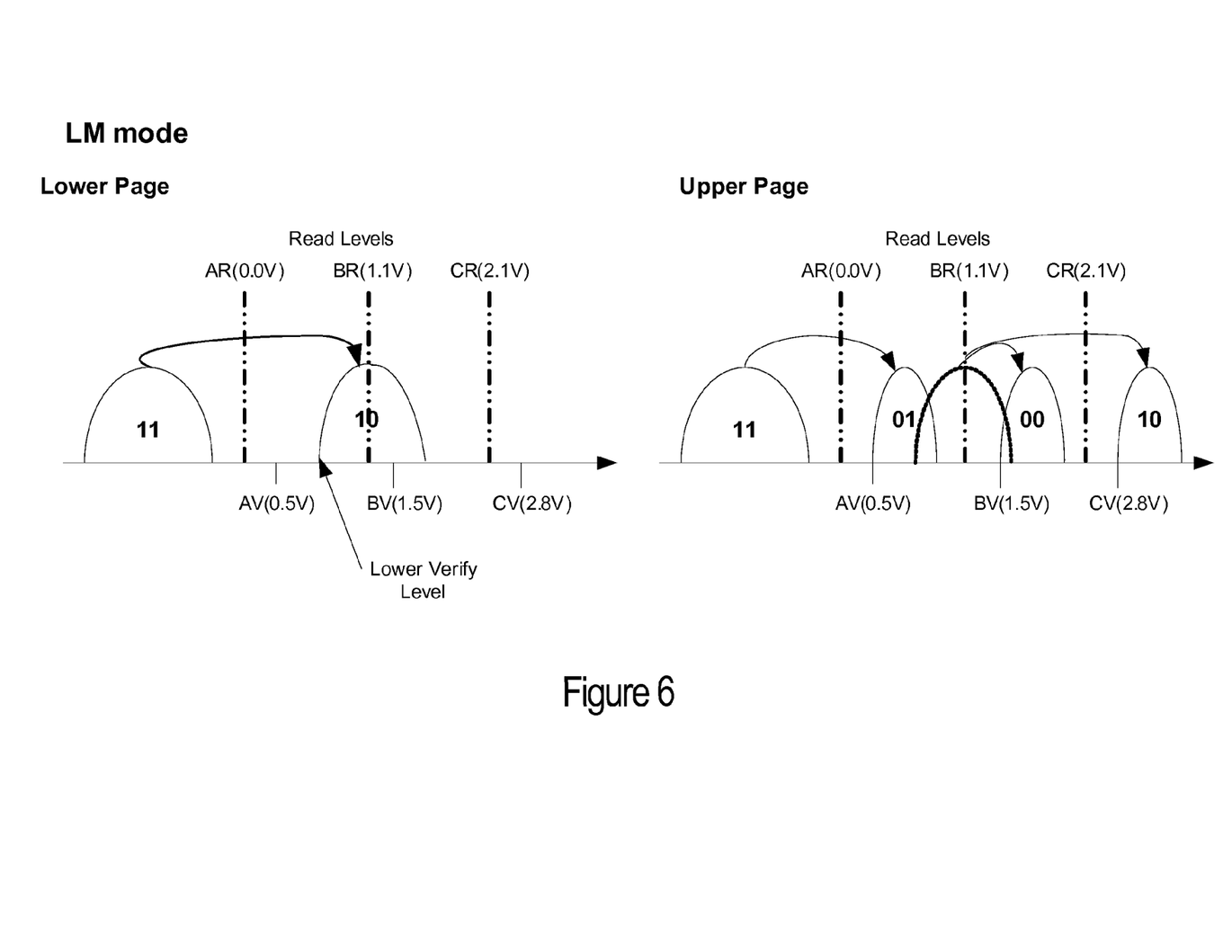
FIG. 6 is a diagram illustrating charge levels in a multi-level cell memory operated to store two bits of data in a memory cell.

FIG. 6 illustrates one implementation of the four charge levels used to represent two bits of data in a memory cell. FIG. 6 is labeled as LM mode which may be referred to as lower at middle mode and will further be described below regarding the lower at middle or lower-middle intermediate state. The LM intermediate state may also be referred to as a lower page programmed stage. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page. The lower page may be considered a logical concept that represents a location on a multi-level cell (MLC). If the MLC is two bits per cell, a logical page may include all the least significant bits of the cells on the wordline that are grouped together. In other words, the lower page is the least significant bits. For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

The memory device may utilize file system details like file types and partitions for identifying and monitoring rewrite frequency. In particular, file types and/or file systems/partitions may be used to predict rewrite frequency which may then be used for keeping hot data (frequently rewritten data) in SLC memory (e.g. binary cache or update blocks) while cold data (not frequently rewritten data) is moved to MLC memory. Utilizing file types and file systems/partitions may allow for accurate predictions of hot/cold data.

Figure 7:
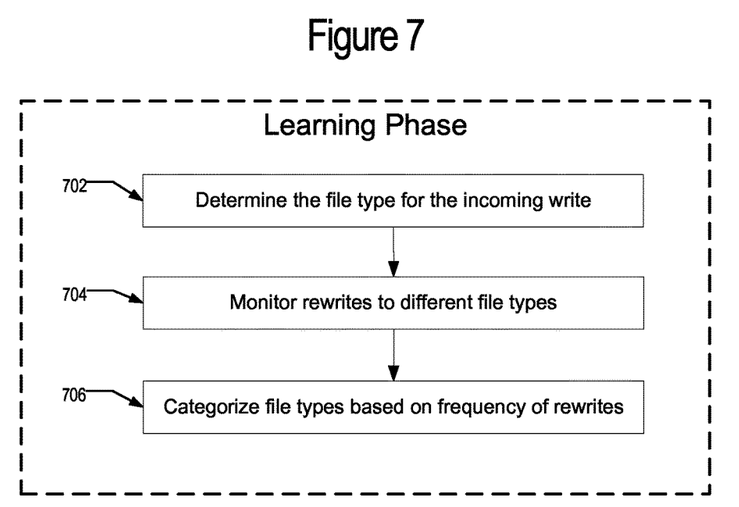
FIG. 7 is a chart illustrating a learning phase for file type differentiation.

FIG. 7 is a flowchart illustrating a learning phase for file type differentiation. The learning phase in FIG. 7 may include an algorithm for learning rewrite frequencies for different file types. The algorithm may be implemented in the flash translation layer as part of the firmware of the memory device. The algorithm learns and associates rewrite frequencies with different file types. That information can then be used in the implementation phase (FIG. 8) to allocate data to the SLC update blocks for frequently rewritten file types and to the MLC memory for less frequently rewritten file types.

In one embodiment, a predetermined number of writes may be required for the learning phase to establish the algorithm initially before the implementation phase. The learning may then be a dynamic process that continues updating during the implementation phase described below with respect to FIG. 8. In block 702, the file type for an incoming write is determined. In block 704, rewrites for different file types are monitored. In block 706, file types are categorized based on the frequency of rewrites. In particular, the algorithm sorts file types based on the rewrite frequency into categories. In one example, there may be three categories that include frequently rewritten, moderately rewritten and rarely rewritten. Alternatively, there may be two categories labeled as hot for frequently rewritten and cold for not frequently rewritten.

Figure 8:
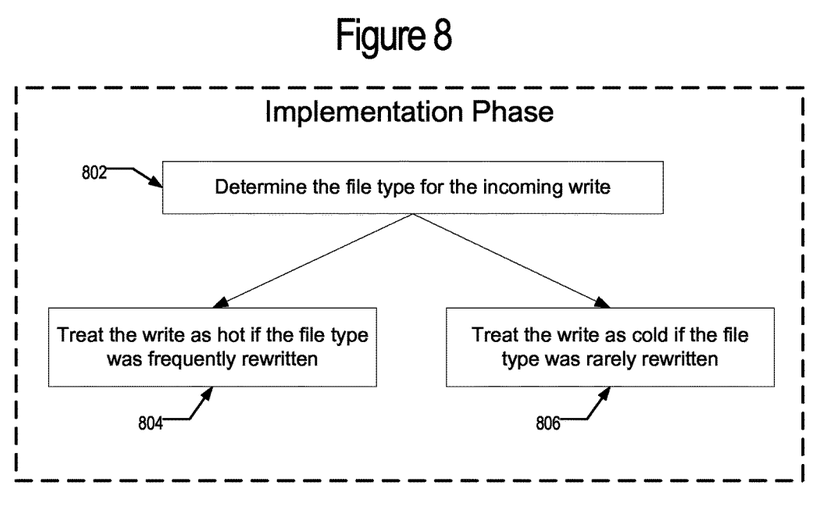
FIG. 8 is a chart illustrating an implementation phase for file type differentiation.

FIG. 8 is a flowchart illustrating an implementation phase for file type differentiation. The implementation phase in FIG. 8 utilizes the categories identified from the learning phase in FIG. 7. The learning algorithm may continue to update during the implementation phase. In block 802, the file type for an incoming write is determined. The file type is then compared with the learning algorithm to determine whether the file type was frequently rewritten as in block 804 or if the file type was not frequently rewritten as in block 806. The implementation illustrated in FIG. 8 includes two categories hot (804) and cold (806), but other embodiments may include more categories. The file types from the learning phase are assigned to those categories and then incoming files can be identified based on the file type.

The categorization for file types can then be used to decide which data stays in the SLC update blocks longer and which data groups can be put into MLC blocks more quickly. In particular, a write that includes a frequently rewritten file type may be placed in the SLC longer and a write with a file type that is not frequently rewritten may be folded into the MLC sooner.

The memory device may know the location of all directories on the memory device and of the file system that is present on it. When the file system is created, the memory device may record the location of the FAT table and location of root directory. The location of other directories may also be recorded when they are created. The file type monitoring algorithm is activated when the root directory of a file is updated by the host with the starting logical block address (LBA), size of the file, and file type. The updates may occur before and/or after the file's data is written. The memory device may need to compare data already present in the directory's location and the data coming in to determine that a directory is being created. This data may be stored in the flash periodically, or it can be constructed by scanning the file system after power up.

The file system directories may have a signature that is recognized by the memory device. Once a directory is updated by the host, the memory device firmware identifies the starting LBA, the size of the file and the file type and associates the LBA information (range including starting LBA and size of file) to that file. The data about the file location within a directory and starting address of the file may also be recorded in the RAM. When the FAT table is updated, the addresses of the file may be determined. The data about files stays in the RAM when that file writes are active and later discarded. When the particular addresses are updated the memory device may be able to associate the addresses to the file.

In one embodiment, a table may illustrate which file types are categorized for rewrite frequency. The exemplary table shown below includes a Panda board running on Android operating system with an application developed to monitor file level writes to the NAND. The table illustrates that a few file types (database files, journal files, metadata files used by applications) may be frequently rewritten, a few file types (text files) are moderately rewritten, and a few file types (pictures and video) are rarely rewritten. In particular, Table 1 includes three categories of rewrite frequency that are associated with file types.

TABLE 1

Exemplary File Types and Rewrite Frequency Categories

| File Type | Rewrite Frequency |
| --- | --- |
| SQL database files (used by FIREFOX) | Updated or rewritten very frequently |
| Journal files associated with database files (used by FIREFOX) | Updated or rewritten very frequently |
| .JSON files (used by FRUIT NINJA) | Updated or rewritten very frequently |
| .URL (used by OPERA) | Updated or rewritten very frequently |
| .TXT (text files) | Updated moderately |
| .JPG, .PNG (picture) | Not updated or rewritten |
| .MPEG (video) | Not updated or rewritten |
| .AMR (audio) | Not updated or rewritten |
| .APK (installation files) | Not updated or rewritten |

Figure 9:
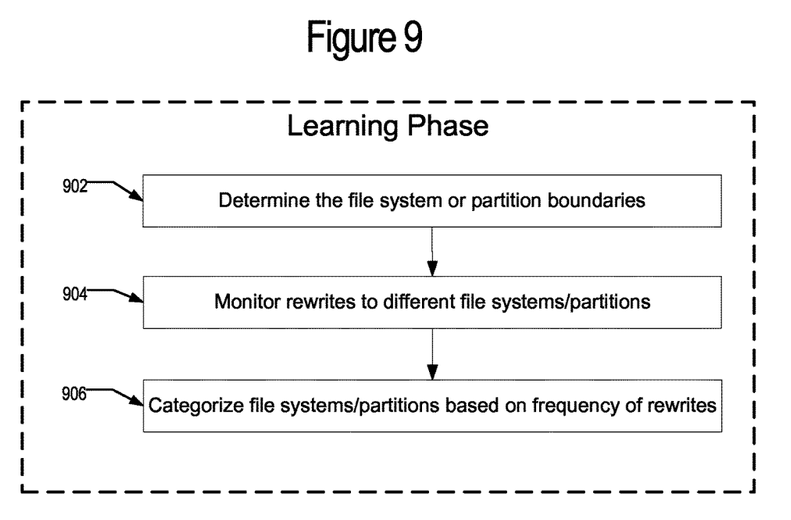
FIG. 9 is a chart illustrating a learning phase for file system or partition differentiation.

FIG. 9 is a flowchart illustrating a learning phase for file system or partition differentiation. As discussed above, the file type for data to be rewritten may be monitored and file types with a high rewrite frequency may be handled accordingly (as "hot" data that is kept in update blocks). Likewise, the file system partition (also referred to as a partition) that the data is to be written to may be another indicator of rewrite frequency (for example in Windows OS, there may be C, D, E partitions where the C drive includes the operating system and the other drives have user data. The C partition may be rewritten frequently, while the other partitions may not be frequently rewritten). The firmware or FTL may operate the algorithm which may identify creation of a partition and identify the partition boundaries.

The learning phase in FIG. 9 is an algorithm for learning rewrite frequencies for different file systems/partitions. The algorithm may be implemented in the flash translation layer or firmware of the memory device. The algorithm learns and associates rewrite frequencies with different file system partitions where the data is to be written. That information can then be used in the implementation phase (FIG. 10) to allocate data to the SLC update blocks for frequently rewritten file types and to the MLC memory for less frequently rewritten file types.

The Master Boot Record (MBR) at LBA 0 may include information about the offset and the range of LBAs of each partition inside the memory device. At the offset mentioned by the MBR, the file system may start. For example, a FAT32 partition may have a partition boot record (PBR) and an EXT4 partition may have a superblock at the start LBA of the partition and so on. Based on the information from MBR, the memory device firmware or FTL can determine and record the LBA ranges belonging to different file systems/partitions.

In one embodiment, a predetermined number of writes may be required for the learning phase to establish the algorithm initially before the implementation phase. The learning may then be a dynamic process that continues updating during the implementation phase described below with respect to FIG. 10. In block 902, the file system/partition for an incoming write is determined. In block 904, rewrites for different file system/partition are monitored. In block 906, file system/partition are categorized based on the frequency of rewrites. In particular, the algorithm sorts file system partitions based on the rewrite frequency into categories. In particular, there may be certain file system partitions that are more likely to include data that is frequently rewritten and there may be certain file system partitions that are less likely to include data that is frequently rewritten. In one example, there may be three categories that include frequently rewritten, moderately rewritten and rarely rewritten. Alternatively, there may be two categories labeled as hot for frequently rewritten and cold for not frequently rewritten.

The partitions may be differentiated based on a rewrite percentage. In particular, the rewrite frequency may be a percentage value for the percent of data or files for that partition that are rewritten. Writes to different partitions may then be handled differently based on this percentage. The percentage may be used to establish categories. Table 2 illustrates one example of using rewrite percentages to monitor and predict future rewrites to a particular partition.

Figure 10:
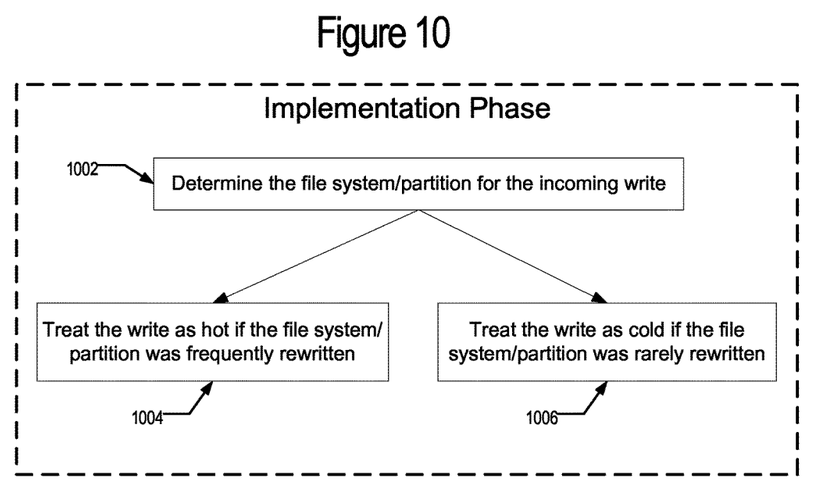
FIG. 10 is a chart illustrating an implementation phase for file system or partition differentiation.

FIG. 10 is a flowchart illustrating an implementation phase for file system partition differentiation. The implementation phase in FIG. 10 utilizes the categories identified from the learning phase in FIG. 9. The learning algorithm may continue to update during the implementation phase. In block 1002, the file system partition for an incoming write is determined. The file system partition is then compared with the learning algorithm to determine whether the file system partition was frequently rewritten to as in block 1004 or if the file system partition was not frequently rewritten to as in block 1006. The implementation illustrated in FIG. 10 includes two categories hot (1004) and cold (1006), but other embodiments may include more categories. The file system partitions from the learning phase are assigned to those categories and then incoming files can be identified based on the file system partition that the incoming files are to be written to.

The categorization for file system partitions can then be used to decide which data stays in the SLC update blocks longer and which data groups can be put into MLC blocks more quickly. In particular, a write that includes data for a file system partition that is frequently rewritten to may be placed in the SLC longer and a write to a file system partition that is not frequently rewritten to may be folded into the MLC sooner.

In one embodiment, a table may illustrate which file system partitions are categorized for rewrite frequency. The exemplary table shown below includes a Panda board running on Android operating system for a mobile device. In this example, the boot and secure disk (SD) card partitions are in a FAT32 partition while the cache, system and operating system (OS) partitions are in an EXT4 partition. The applications are installed in EXT4 OS partition and the application's background handling files (e.g. database files) are in EXT4 memory, which results in frequent rewrites. The downloaded files, pictures captured, video captured, data transferred from PC etc., are stored in the SD card FAT32 partition, which has fewer rewrites. Accordingly, the example in the table illustrates two partitions and includes the percentage of pages rewritten for a particular user case for the two partitions. Based on these results, it may be predicted that data (pages) written to the EXT4 partition is hot data that should be kept in SLC (update blocks) memory for as long as possible, while data written to the FAT32 partition is cold data that can be transferred immediately to the MLC memory.

TABLE 2

Exemplary Partitions and Rewrite Percentages for Different User Cases

| User Case | EXT4 Partition | FAT32 Partition |
| --- | --- | --- |
| Boot up | 13.2% | 1% |
| Applications installed | 8.3% | 0% |
| Web browsing with GOOGLE browser | 64.8% | 3.2% |
| Web browsing with FIREFOX | 71% | 4% |
| Streaming in YOUTUBE | 58.2% | 1% |
| Browsing + Online Stream Video + Copy file | 67.5% | 1% |
| Picture capture | 97.2% | 17.1% |
| Video recording | 83.3% | 8.5% |

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for dynamically controlling rewriting of data, the method comprising:
utilizing a dynamic learning phase that comprises:
tracking a number of rewrites for data to be written;
comparing the number of rewrites for different file types and to different file system partitions;
recording rewrite frequency for the different file types and for the different file system partitions based on the comparing;
associating, based on the recorded rewrite frequency, each of the file types with a category based on the rewrite frequency for that file type; and
associating, based on the recorded rewrite frequency, each of the file system partitions with a category based on the rewrite frequency for that file system partition; and
utilizing an implementation phase that is activated when the learning phase has been utilized for a predetermined number of writes, wherein the implementation phase comprises:
receiving a write request for data to be written;
identifying a file type and a file system partition for the data to be written;
determining a category associated with either the identified file type or the identified file system partition; and
storing the data to be written in single level cell (SLC) memory if either the category for either the identified file type or the identified file system partition includes an indication of frequent rewriting.

2. The device of claim 1 wherein the SLC memory comprises one or more update blocks.

3. The device of claim 1 wherein the storing the data by the controller further comprises:
moving data to be written that is associated with either a file type or a file system partition that has a low rewrite frequency to multi-level cell (MLC) memory.

4. A flash memory device comprising:
a non-volatile storage having memory blocks storing data; and
a controller in communication with the non-volatile storage, the controller is configured for:
utilizing a dynamic learning phase that comprises:
tracking a number of rewrites for data to be written;
comparing the number of rewrites for different file types and to different file system partitions;
recording rewrite frequency for the different file types and for the different file system partitions based on the comparing;
associating, based on the recorded rewrite frequency, each of the file types with a category based on the rewrite frequency for that file type; and
associating, based on the recorded rewrite frequency, each of the file system partitions with a category based on the rewrite frequency for that file system partition; and
utilizing an implementation phase that is activated when the learning phase has been utilized for a predetermined number of writes, wherein the implementation phase comprises:
receiving a write request for data to be written;
identifying a file type and a file system partition for the data to be written;
determining a category associated with either the identified file type or the identified file system partition; and
storing the data to be written in single level cell (SLC) memory if either the category for either the identified file type or the identified file system partition includes an indication of frequent rewriting.

5. The device of claim 4 wherein the determined category comprises a hot category for frequently rewritten file system partitions and a cold category for rarely rewritten file system partitions.

6. The device of claim 5 wherein the storing the data further comprises:
maintaining, for the hot category, the data to be written in the SLC memory; and
transferring, for the cold category, the data to be written to multi-level cell (MLC) memory.

7. The device of claim 6 wherein the SLC memory comprises one or more update blocks and the hot category data is maintained in the update blocks for a longer time than the cold category data is maintained in the MLC memory.

8. The device of claim 4 wherein the storing the data by the controller further comprises:
maintaining data to be written that is associated with a file system partition that has a high rewrite frequency in update blocks; and
moving data to be written that is associated with a file system partition that has a low rewrite frequency to multi-level cell (MLC) memory.

9. The device of claim 4 wherein the determined category comprises three categories, the categories including most frequently rewritten data, less frequently rewritten data, and rarely rewritten data.

* * * * *